(12) United States Patent
Diehl et al.

(10) Patent No.: US 9,558,889 B2
(45) Date of Patent: Jan. 31, 2017

(54) CAPACITOR DEVICE FOR A CONDUCTOR LOOP IN A DEVICE FOR THE IN-SITY PRODUCTION OF HEAVY OIL AND BITUMEN FROM OIL-SAND DEPOSITS

(71) Applicants: Dirk Diehl, Bubenreuth (DE); Andreas Koch, Neunkirchen am Brand (DE)

(72) Inventors: Dirk Diehl, Bubenreuth (DE); Andreas Koch, Neunkirchen am Brand (DE)

(73) Assignee: Siemens Aktiengesellschaft, München (DE)

( * ) Notice: Subject to any disclaimer, the term of this patent is extended or adjusted under 35 U.S.C. 154(b) by 215 days.

(21) Appl. No.: 14/354,037

(22) PCT Filed: Oct. 17, 2012

(86) PCT No.: PCT/EP2012/070560
§ 371 (c)(1),
(2) Date: Apr. 24, 2014

(87) PCT Pub. No.: WO2013/060610
PCT Pub. Date: May 2, 2013

(65) Prior Publication Data
US 2014/0301017 A1    Oct. 9, 2014

(30) Foreign Application Priority Data

Oct. 27, 2011   (EP) .................................... 11186890
Feb. 9, 2012    (EP) .................................... 12154736

(51) Int. Cl.
*H01G 4/30*    (2006.01)
*E21B 43/24*   (2006.01)
(Continued)

(52) U.S. Cl.
CPC ................ *H01G 4/30* (2013.01); *E21B 36/04* (2013.01); *E21B 43/24* (2013.01);
(Continued)

(58) Field of Classification Search
CPC .......... H01G 4/30; H01G 4/018; H01G 4/224; H01G 4/38; H01G 4/04; H01G 4/228; H01G 4/40
See application file for complete search history.

(56) References Cited

U.S. PATENT DOCUMENTS 2,443,605 A  *  6/1948   De Lange Cornelis ................ H01G 4/224
174/50.56
2,454,102 A  *  11/1948  Stacy ....................... H01G 4/02
361/303

(Continued)

FOREIGN PATENT DOCUMENTS

| DE | 102008044953 | 3/2010 |
|---|---|---|
| WO | WO2009027305 | 3/2009 |
| WO | WO2009109489 | 9/2009 |

OTHER PUBLICATIONS

European Search Report and Written Opinion cited in EP12154736, mailed Aug. 1, 2013.

(Continued)

*Primary Examiner* — David M Sinclair
(74) *Attorney, Agent, or Firm* — Lempia Summerfield Katz LLC (57) ABSTRACT

The embodiments relate to a capacitor device for a conductor loop in a device for the in-situ production of heavy oil and bitumen from oil-sand deposits, characterized by a housing and a capacitor unit arranged therein to compensate for the inductive voltage drop along the conductor loop, wherein there are two connection interfaces, wherein each connection interface is designed for mechanical and electrically conductive connection between the capacitor unit and a conductor element of the conductor loop.

20 Claims, 6 Drawing Sheets

(51) Int. Cl.
*H01G 4/40* (2006.01)
*E21B 36/04* (2006.01)
*H01G 4/38* (2006.01)
*H01G 4/04* (2006.01)
*H01G 4/228* (2006.01)
*H01G 4/018* (2006.01)
*H01G 4/224* (2006.01)
*H01G 13/00* (2013.01)

(52) U.S. Cl.
CPC ......... *E21B 43/2401* (2013.01); *H01G 4/018* (2013.01); *H01G 4/04* (2013.01); *H01G 4/224* (2013.01); *H01G 4/228* (2013.01); *H01G 4/38* (2013.01); *H01G 4/40* (2013.01); *H01G 13/00* (2013.01); *Y10T 29/43* (2015.01)

(56) References Cited

U.S. PATENT DOCUMENTS

| | | | | |
|---|---|---|---|---|
| 3,278,815 A | * | 10/1966 | Booe | H01G 4/1209 106/286.6 |
| 3,505,575 A | | 4/1970 | Spartacus | |
| 5,587,869 A | * | 12/1996 | Azumi | H01G 4/224 361/301.3 |
| 2010/0202095 A1 | * | 8/2010 | Kyouda | H01G 2/106 361/301.3 |
| 2011/0006055 A1 | | 1/2011 | Diehl | |
| 2011/0042063 A1 | | 2/2011 | Diehl et al. | |
| 2011/0146968 A1 | | 6/2011 | Diehl | |

OTHER PUBLICATIONS

PCT International Search Report and Written Opinion cited in PCT/EP2012/070560, mailed Nov. 20, 2012.

\* cited by examiner

Resonance length

FIG 8

CAPACITOR DEVICE FOR A CONDUCTOR LOOP IN A DEVICE FOR THE IN-SITY PRODUCTION OF HEAVY OIL AND BITUMEN FROM OIL-SAND DEPOSITS

CROSS-REFERENCE TO RELATED APPLICATIONS

The present patent document is a §371 nationalization of PCT Application Serial Number PCT/EP2012/070560, filed Oct. 17, 2012, designating the United States, which is hereby incorporated by reference, and this patent document also claims the benefit of EP 11186890.7, filed Oct. 27, 2011, and EP 12154736.8, filed Feb. 9, 2012, which are also hereby incorporated by reference.

TECHNICAL FIELD

The embodiments relate to a capacitor device for a conductor loop of a device for the "in situ" production of heavy oil and bitumen from oil sands deposits, to a conductor loop including a multiplicity of conductor elements and a capacitor device, and to a method for producing a conductor loop.

BACKGROUND

It is known that, for the production of oil, it is also possible to use oil deposits in which the oil needs to be separated from the sand in a separation process. In deposits in which the oil sands are not accessible using open-pit mining, however, production of the oil may be performed by heating the oil sands. As a result, the viscosity of the bound oil is reduced such that the oil may be pumped away in a conventional manner. In known methods, heated vapor, heated air, or similar hot gases are used for heating the oil sands. This is associated with the disadvantage that it is necessary to provide the possibility, in a very complex manner, of transporting the gases into the desired position in the ground, namely to the deposit location of the oil sands. Furthermore, owing to sometimes very deep and extensive deposits, a high degree of complexity in respect of the pressure loss occurring during introduction of the gases/vapors needs to be considered.

It is furthermore known that an induction cable is used to generate an induced eddy current in the surrounding ground for heating the ground. Alternating current with a frequency range of from 10 kHz to 200 kHz may be applied to such an induction cable, and such an induction cable is laid as a conductor loop in the ground of a reservoir.

In order to achieve the desired induced eddy currents in the ground, a corresponding alternating current is applied to the conductor loop. Owing to the long length of such a conductor loop that may be up to several kilometers, however, there is the problem that relatively high voltage drops are produced by the voltages induced in the surrounding ground. These high voltage drops result in immense costs and complexities in terms of the device for operating such a conductor loop.

WO 2009/027305 A2 discloses, in principle, a solution to such a problem. The document describes that individual filaments form a conductor with a distributed capacitance. In other words, a multiplicity of capacitors is distributed substantially constantly over the course of the conductor loop, with the result that compensation of the inductive voltage drop may be produced by these capacitors.

One disadvantage with the above-described solution is that the distributed capacitor arrangement represents a restriction in terms of the mechanical properties of the conductor loop itself. The conductor loop needs to be introduced into the ground, for example, through a bore hole. Furthermore, the conductor loop does not necessarily run along a straight path, but may also have bends and curvatures. Correspondingly, care needs to be taken when introducing and operating such a conductor loop to provide that the line elements or all of the component parts of the conductor loop withstand corresponding tensile loading or corresponding bending loading. This provides that known conductor loops with distributed capacitances cannot be used in all use sectors. Furthermore, the use possibilities for a wide variety of materials for the dielectric materials of the individual capacitors are restricted since the materials likewise need to withstand the corresponding bending stresses and tensile stresses. Furthermore, this results in larger cable thicknesses or poorer compensation performances.

SUMMARY AND DESCRIPTION

The scope of the present invention is defined solely by the appended claims and is not affected to any degree by the statements within this summary. The present embodiments may obviate one or more of the drawbacks or limitations in the related art.

The object of the embodiments includes at least partially elevating the above-described disadvantages in the case of devices for the production of heavy oil and bitumen from oil sands deposits. In particular, the object of the embodiments includes providing a capacitor device for a conductor loop of a device for the "in situ" production of heavy oil and bitumen from oil sands deposits, a corresponding conductor loop and a method for producing the conductor loop. In these embodiments, the device, conductor loop, and method are capable of providing, in a cost-effective and simple manner, the desired resistance to tensile stresses and bending stresses and high levels of dielectric strength or resistance to partial discharges of the capacitor.

Here, features and details that are described in connection with the capacitor device also apply in connection with the method and the conductor loop, and in each case vice versa, with the result that reference is or may be made always mutually with respect to the disclosure of the individual aspects of the embodiments.

A capacitor device is suitable for a conductor loop of a device for the "in situ" production of heavy oil and bitumen from oil sands deposits. It is characterized in that a housing and a capacitor unit arranged therein for compensating for the inductive voltage drop along the conductor loop are provided. Furthermore, two connection interfaces are provided, wherein each connection interface is designed for the mechanical and electrically conductive connection between the capacitor unit and a line element of the conductor loop. Thus, a capacitor device may be inserted in each case between two line elements. This provides that each capacitor device remains mechanically and electrically connected to one adjacent line element per connection interface, e.g., in total to the two adjacent line elements via the two connection interfaces. Given the provision of a plurality of capacitor devices, one single capacitor device may be arranged between two adjacent line elements. It is also possible to speak of the connection interfaces being designed for, in each case, one single line element, with the result that a multiple assignment of the interfaces or of the line element is not provided.

The design of the connection interfaces for the mechanical and electrical connection may be configured such that these two types of connection are provided via the same connection interface and/or at the same point on the connection interface. Furthermore, it is also possible for the mechanical connection to be performed, in particular, in a force-fitting manner, locally separate from the electrical connection, in particular, in a flexible and electrically insulating manner. Litz wires, spiral springs, strips and/or lugs may be used for the electrical contact-making, for example.

By virtue of a capacitor device, the desired capacitance for compensating for the inductive voltage drop is concentrated in the capacitor device, as a result of which the line elements may be simple conductors. These line elements may be in the form of metal pipes, (e.g., aluminum or copper pipes). Owing to the concentration of the capacitances in the capacitor device, different mechanical loading situations by the line elements or the capacitor device may be provided. Thus, the capacitor device may be designed so as to be mechanically relatively rigid since the capacitor device has a small axial dimension in relation to the total length of the conductor loop. In particular, the capacitor device is in the range between 0.5 and 1 m long or approximately 60 cm long. Thus, as the capacitor device is inserted into a bore hole, such a capacitor device may also be guided around corresponding radii without bending of the capacitor device itself being necessary. A relatively high tensile loading is also not necessary owing to the capacitor device, since the tensile loading may likewise be borne by the line elements.

In comparison with known devices, such as are disclosed in WO 2009/027305, separation of the mechanical and electrically conductive interface from the capacitor effect, in particular, from the dielectric, is achieved. The transmission of mounting forces or stresses during introduction of the conductor loop into a bore hole is in this way performed by these connection interfaces and no longer by the capacitor unit, in particular, not by the dielectric or the capacitor plates. The capacitor device forms thereon so to speak a capacitor module that decouples the mechanical connection to the line elements from the capacitor function and the associated components parts of the capacitor unit, via the connection interfaces.

The line elements are themselves markedly longer and are, for example, between 10 and 20 m long. This provides that the line elements provide the desired bending freedom in order to follow a linear or curved profile in the interior of a reservoir of an oil sands deposit. In other words, by virtue of a capacitor device, a concentrated capacitance is made available, with the result that, in respect of the mechanical requirements made of the conductor loop, it is possible to refer to a differentiation between the flexibility of the line elements, on the one hand, and high mechanical rigidity of the capacitor device, on the other hand.

The capacitor unit of a capacitor device may be formed differently. Capacitor plates or plate-like elements may be used in order to provide the desired capacitance in the capacitor unit. More complex embodiments, such as, for example, coated flexible films that are coated with vitreous dielectric films, may be possible and enable even wider or more flexible shapes of such a capacitor device. The entire capacitor device may be between half a meter and approximately 1 m, (e.g., approximately 0.6 m long). The capacitor device has a thickness of approximately 50 to 250 mm, in particular between approximately 100 and approximately 180 mm. The capacitor device thus may correspond to the diameters of the adjoining and adjacent line elements, with the result that the capacitor device may be introduced into a conductor loop substantially seamlessly. In respect of the total length, the individual capacitor devices may extend over less than 50% of the total length of a conductor loop. This value may be even lower, for example, between approximately 5% and approximately 20% of the length of the conductor loop. In this way, so to speak discrete capacitors or discrete capacitances are provided that may be built into such a conductor loop substantially flexibly in terms of their locations.

The connection interfaces in the case of a capacitor device may be arranged on the two end sides in relation to the axial extent of the capacitor device. This provides that the capacitor devices may be integrated particularly easily in the profile of a conductor loop since the capacitor devices substantially follow the geometry of the conductor loop or the adjacent line elements.

A capacitor device may be manufactured or connected to the line elements both in situ in the case of use in a bore hole, e.g., prior to insertion into the bore hole, and at their mounting position. This increases the flexibility of use of the capacitor devices since it is possible to decide in situ, in particular, on site prior to insertion into a bore hole where or how many capacitor devices are required at specific positions on the conductor loop.

A further advantage may be achieved by virtue of the fact that, in the case of a capacitor device, the capacitor unit has at least two capacitor plates having a dielectric layer arranged therebetween. In this case, the capacitor plates are each in electrically conductive contact with a connection interface. In other words, contact with the respectively adjacent line element is thereby produced. This provides that, for example, a first line element is in electrically conductive contact directly or indirectly with a first capacitor plate or with a first set of capacitor plates, via a first connection interface. The same also applies to a second, (e.g., right-hand), line element, which is in direct or indirect electrically conductive contact with a second capacitor plate or a second set of capacitor plates via the second connection interface. The individual capacitor plates are arranged opposite one another and insulated from one another so that a dielectric layer is formed between the individual capacitor plates. Thus, the desired capacitance is available for the compensation of the induced voltage drops. A multiplicity of capacitor plates may be provided. In total, the number of individual capacitor plates may be from 100 to 1000. The capacitor plates may be formed from aluminum or copper, for example. The thickness of the individual plates is kept relatively small and is in particular in the region of approximately 30 μm. The distances between the capacitor plates may be substantially constant, with the result that this may be referred to as a substantially parallel arrangement. Thus, a high capacitance may be provided on a relatively small physical area, with the result that, even in the case of a compact embodiment of the capacitor device, the desired advantages may be achieved.

It is further advantageous if, in the case of a capacitor device, the capacitor unit has two plate carriers, on which at least one capacitor plate is arranged electrically conductively. Thus, the plate carrier is used for mechanically supporting the capacitor plates. The plate carrier carries these capacitor plates that are arranged in particular parallel to one another on the plate carrier. This provides that, when there are two plate carriers each having capacitor plates arranged substantially parallel, the corresponding capacitor plate stacks of the two plate carries mesh with one another in the manner of a comb, for example. Thus, a capacitance with respect to the opposite capacitor plate is made available to most of the capacitor plates on their two sides via a dielectric layer. In other words, in this embodiment, the plate carrier may also be referred to as indirect electrically conductive contact between the respective capacitor plate and the respective connection interface.

It is likewise advantageous if, in the case of a capacitor device, at least one plate carrier has, at least sectionally, a half-shell formation. Since known conductor loops are often line elements that have a round or substantially round cross section, a plate carrier that, substantially sectionally, has the shape of a half shell follows this substantially round cross-sectional shape. A half-shell formation of the plate carrier may refer to a geometric extent that follows a curved surface. Thus, owing to the at least sectional bending of a planar plate, such a half-shell-shaped plate carrier may be produced. Thus, improved integration of the capacitor device in a known conductor loop may be achieved. Furthermore, the space in the interior of the capacitor device, e.g., in the interior of the housing, is utilized particularly advantageously. Thus, the half-shell-shaped plate carriers may extend, for example, along a cylinder lateral surface or a section of a cylinder lateral surface. Therefore, it may be possible to refer to a cylinder half-shell that has an extent in particular of approximately 140° around the cylinder axis. The capacitor plates in the case of such an embodiment have at least one rounded or partially rounded edge, which is plugged into this cylinder half-shell or is in electrically conductive contact therewith.

It may further be advantageous if, in the case of a capacitor device, the capacitor plates have, at least partially, a coating as dielectric layer. In this way, the required dielectric layer may be made available completely or at least partially for forming the desired capacitances. If the capacitor plates are coated prior to assembly, the respective dielectric layer may also be used as adhesive material between the individual capacitor plates, for example by virtue of the plates being compressed to form a composite structure. The coating may be a ceramic material, which entails the desired requirements in terms of electrical engineering even at high temperatures. A ceramic material may be used in the case of a capacitor device since, given a distributed capacitance in accordance with the prior art, the ceramic material would be damaged by the resultant tensile and bending loading when the conductor loop is introduced into the ground. By virtue of the concentration of the capacitances, the mechanical loads are focused on the line elements, with the result that the capacitor device may be configured so as to be mechanically more rigid and therefore better protected. Thus, it is also possible to use more sensitive materials, such as ceramic materials, for example, as the dielectric layer. It is also possible for other materials, such as glass or vitreous materials or glass films, for example, to be used as the dielectric layer. The use of mica as the dielectric layer is also conceivable.

It is likewise advantageous if, in the case of a capacitor device, the dielectric layer is, at least partially, in fluid form. For this purpose, the distances between the individual capacitor plates may be kept constant or substantially constant. This may be performed, for example, via a holder, in particular in the form of a cage. This provides that the cage-like formation of the individual capacitor plates has a mechanical stability, but the dielectric layer, as a fluid, does not transmit any mechanical stress, or only transmits a low level of mechanical stress, onto the respective capacitor plate. The fluid used may be, for example, a liquid or a gas, (e.g., an inert gas). Thus, a capacitor device may be designed to be even less sensitive to mechanical loading from the outside.

Furthermore, it may be advantageous if, in the case of a capacitor device, the capacitor unit and/or the housing is/are filled with a free-flowing, curable material. The material may be a resin material, in particular, synthetic resin, for example. An example of this resin material is epoxy resin. This free-flowing, curable material may represent the electrical insulation of the capacitor unit in the housing. Furthermore, this filler may also represent the dielectric layer partially or completely. The fillers may be furthermore matched to thermal expansions for temperature ranges up to 300° C. In particular, the focus of this matching of fillers is to minimize the thermal expansion of the material in order to reduce mechanical stresses in the interior of the capacitor device. Ceramic or partially ceramic potting is also conceivable, which likewise at the same time forms the dielectric layer of the capacitor unit. The potting may also have a high-temperature adhesive.

A further advantage is achieved when, in a capacitor device, the connection interfaces are designed for at least one of the following types of mechanical connection: (1) screwing, (2) welding, (3) riveting, or (4) fitting, in particular, press fitting.

The above list includes possibilities that, in a non-restrictive manner, represent the mechanical connection component of the respective connection interface. In particular, the mechanical connection component may be produced in situ, for example, when fitting or screwing is used. In this case, this formation of the mechanical connection may involve insulation, with the result that, for example, in each case the connection interface may include insulating material, for example in the form of an O ring.

A further subject matter includes in a conductor loop including a multiplicity of line elements for a device for the "in situ" production of heavy oil and bitumen from oil sands deposits. Such a conductor loop is characterized by the fact that, between a plurality of in each case two adjacent conductor elements, a capacitor device is electrically conductively and mechanically connected to the adjacent line elements via its connection interfaces. In other words, this is a conductor loop in which a multiplicity of line elements and a multiplicity of capacitor devices are used. One single capacitor device may be arranged between two adjacent line elements. The distribution of the capacitor devices may be either symmetrical or asymmetrical. This provides that a distribution of the capacitor device may be performed uniformly over the entire conduction loop. It is also possible for individual regions of the conductor loop to be provided with a higher density of capacitor devices, (e.g., every 15 m). Other regions are provided with a lower density of capacitor devices, (e.g., every 40 m). In this case, it is possible to respond in a flexible manner to corresponding situations in the ground, with the result that unnecessarily high numbers of capacitor devices may be avoided and thus costs may be reduced. Owing to the use of a capacitor device, a conductor loop has the same advantages as have been explained in detail with reference to the capacitor device. The line elements are formed from aluminum or copper, for example, and are in particular non-ferromagnetic in order to reduce or avoid hysteresis losses. The line elements of the conductor loop may have the same or substantially the same tensile strengths.

A conductor loop may be developed to the extent that the number of line elements exceeds the number of capacitor units by more than 1. This provides that two or more line elements are arranged at least between two capacitor units. This provides that the distance between the individual capacitor units may be matched in a flexible manner by virtue of the number of correspondingly used line elements lying therebetween. This is performed, in particular, in situ, with the result that by virtue of providing two single basic component parts, namely a line element of approximately 20 m, for example, and a capacitor device, a multiplicity of flexible configurations may be selected.

A further embodiment of the conductor loop may be achieved by virtue of the fact that the line elements include, at least partially, metallic pipes, in particular aluminum pipes. Owing to the fact that primarily the surface of the line elements is used for the desired induction in the surrounding ground, material may be saved owing to the use of metallic pipes. In particular, the pipes are completely hollow on the inside, with the result that a saving is also made on weight. The surface of these metallic pipes may be coated with insulation in order to avoid short circuits with the surrounding ground. Copper pipes are also conceivable as an alternative to aluminum pipes, for example.

A conductor loop may be developed such that the line elements, at least sectionally, are bendable and/or capable of being subjected to tensile loading. In particular, this enables a bending of radii up to 100 m, wherein tensile loading of in particular more than 10 t is possible. This flexibility or capacity for tensile loading is particularly important during introduction into the ground. The flexibility may be experienced substantially exclusively by the line elements, with the result that the capacitor devices may correspondingly have a higher mechanical stability, while the tensile loading capacity of line elements and capacitor devices needs to be met in the same way.

Some embodiments further relate to a conductor loop, in particular, in accordance with the above paragraphs, wherein the conductor loop is in the form of an inductor cable for inductively heating a heavy oil or oil sands deposit. Thus, some embodiments relate to a capacitively compensated inductor with concentrated, ceramic-based capacitors for increased thermal resistance for inductively heating heavy oil and oil sands deposits.

For the production of ultra-heavy oils or bitumen from oil sands or oil shale deposits by pipe systems that are introduced through bore holes, the free-flowing capacity of the oils needs to be considerably increased. This may be achieved by increasing the temperature of the deposit (reservoir). For this purpose, inductive heating may be used exclusively or in support of the conventional SAGD (steam-assisted gravity drainage) method. In this case, the electromagnetically inductive heating includes a conductor loop that is laid in the reservoir and, when energized, induces eddy currents in the surrounding ground that heat this ground. In order to achieve the desired heating power densities from 1 to 10 kW per meter of inductor length (for example), it is necessary to impress current intensities of a few hundred amperes at frequencies 20-100 kHz (for example), depending on the conductivity of the reservoir. In order to compensate for the inductive voltage drop along the conductor loop, capacitances are interposed, as a result of which a series resonant circuit is produced that is operated at its resonant frequency and represents a purely resistive load at the terminals. Without these series capacitors, the inductive voltage drop of the conductor loops that are up to several hundred meters long would amount to a few 10 kV up to over 100 kV at the connection terminals, which may barely be handled, inter alia, with respect to the insulation from the ground. Furthermore, the compensation of the reactive power would have to take place at or in the generator (oscillator).

Figure 1:
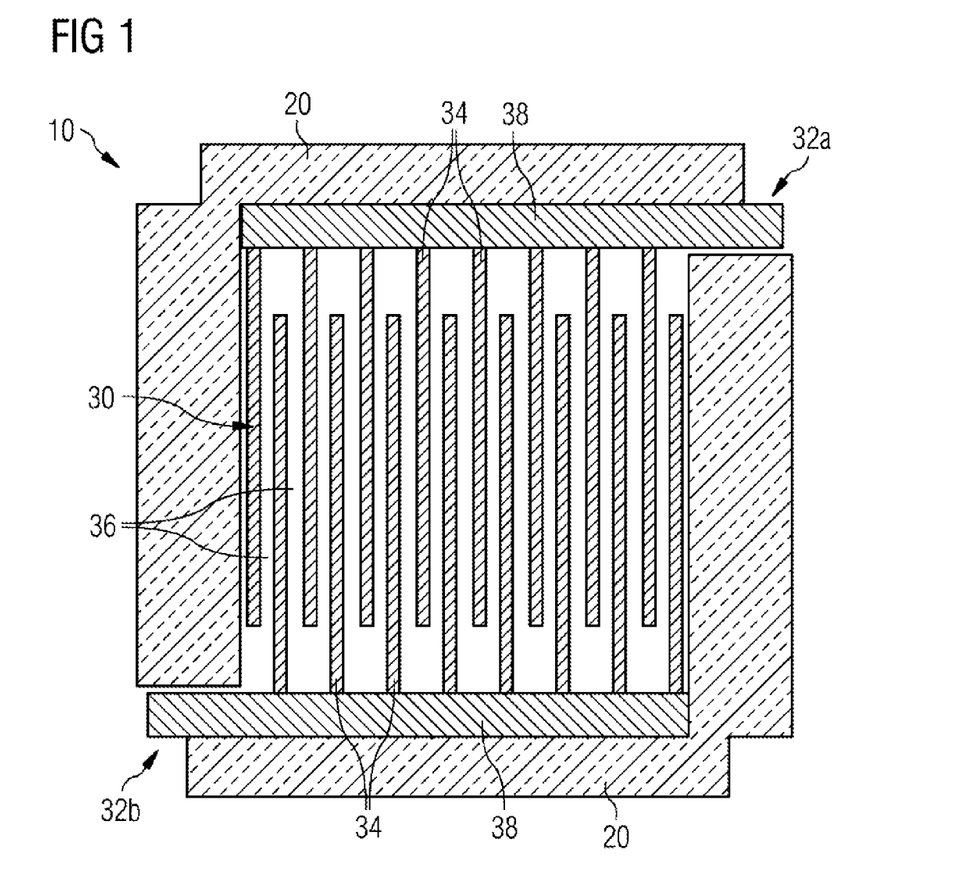
FIG. 1 depicts, schematically, a first embodiment of a capacitor device.
Figure 5:
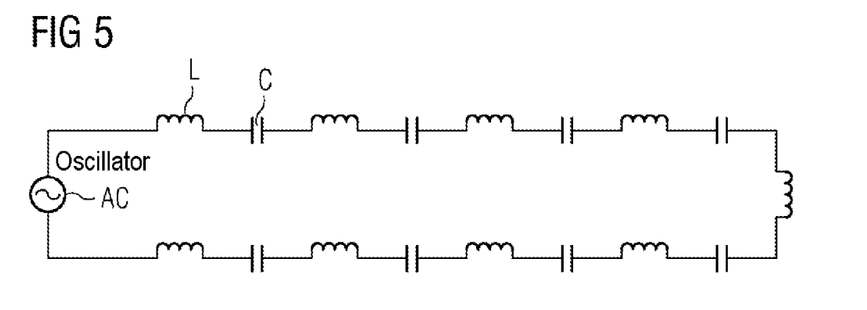
FIG. 5 depicts, schematically, an example circuit diagram of a series resonant circuit including concentrated capacitances for compensating for the line inductances.
Figure 6:
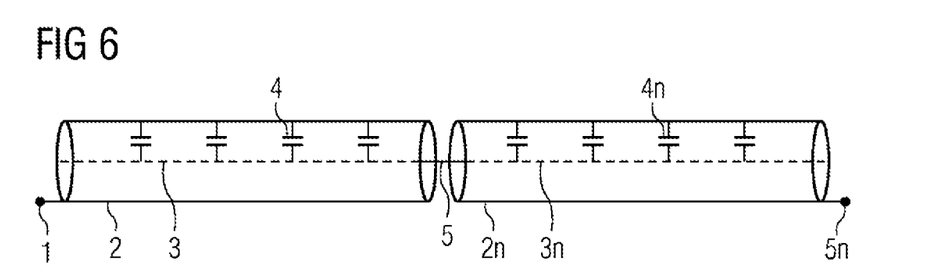
FIG. 6 depicts an example schematic of a capacitively compensated coaxial line with distributed capacitances.
Figure 7:
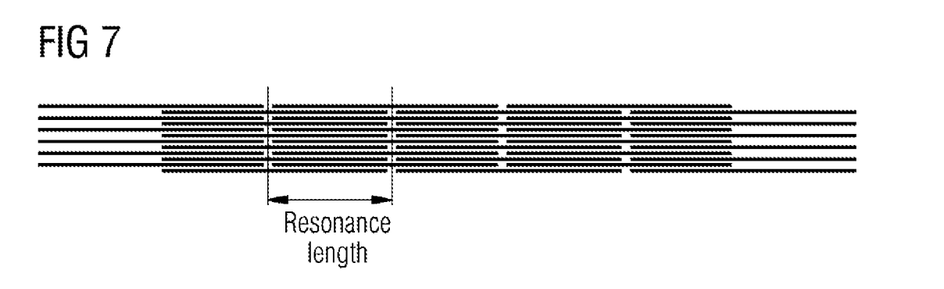
FIG. 7 depicts an example schematic of the capacitively coupled filament groups in the longitudinal direction.

In the case of the capacitors connected in series with sections of the conductor loop, it is possible to distinguish between concentrated capacitors (cf. FIG. 5) and capacitors distributed over the line (cf. FIG. 6 and FIG. 7). FIG. 1 depicts a circuit diagram of a series resonant circuit including concentrated capacitances for compensating for line inductances. FIG. 6 depicts a schematic illustrating a capacitively compensated coaxial line with distributed capacitances. FIG. 7 depicts a schematic of the capacitively coupled filament groups in the longitudinal direction.

Previous developments in the technology have concentrated on the distributed capacitances and in the process on polymer-insulated (for example fluoropolymers, PEEK) multifilament conductors. The problem with capacitively compensated inductors with polymer-based insulation/dielectric systems includes in the upwardly restricted operating temperature range. The dielectric strength and resistance to partial discharges are reduced considerably when temperatures of approximately 150° C. are reached or exceeded. While in the case of heavy oil reservoirs a temperature increase of below 50° C., for example, may be sufficient to accelerate the production considerably, in the case of bitumen (oil sands) reservoirs, higher temperatures (>100° C.) may be required. In hybrid methods (SAGD assisted by inductive heating, EM-SAGD), it may therefore additionally be expected that vapor from the injector or a growing vapor chamber reaches the inductor, with the result that temperatures above 200° C. may be present at the inductor.

In the case of the design of capacitively compensated inductors with polymer insulation systems, the considerably reduced dielectric strength and resistance to partial discharges at relatively high temperatures needs to be taken into consideration. This may be performed by virtue of the voltages occurring across the capacitances being correspondingly reduced. For this purpose, it is necessary to increase the number of capacitances connected in series in such a way that the total inductive voltage drop is distributed among so many capacitors that the voltage limit reduced owing to the increased temperature is maintained. Connecting more capacitors in series does, however, reduce the total capacitance, which needs to be compensated for by increased capacitance of the individual capacitor if the operating frequency (resonant frequency) is intended to be kept constant. In the case of the distributed capacitors, which utilize the capacitance per unit length between conductor groups, this results in an increased cross section of the line with a correspondingly increased usage of materials. Furthermore, the number of interruptions (cf. FIG. 3) is increased, owing to the shortened resonance lengths, which is associated with further increased production complexity.

Against this background, the object of this embodiment includes further optimizing the above-described device or solving the mentioned problems.

This aspect is based on the separation of the functions of the electrical conductor insulation and the capacitor dielectric, both of which until now may be achieved by the polymer-based insulation system.

A capacitively compensated inductor is constructed with concentrated capacitors as depicted in FIG. 5, wherein the capacitors have a ceramic (crystalline or vitreous) dielectric. An inductor cable is in particular in the form of a conductor loop and a capacitor is in particular in the form of a capacitor device. In this case, a concentrated capacitor allows that the sum of the physical lengths of all of the capacitors may make up one small length component (e.g., 5-20%, or 50%) of the total length of the conductor loop. The electrical and mechanical connections between the capacitors, which substantially contribute to the inductances according to FIG. 5, are formed by line sections that may be pipes or filament conductors (litz wires). The electrical and mechanical (force-fitting) connections between capacitors and line sections (line elements), e.g., the connection interfaces, may be provided by screwing, welding, shrinkfit connections or adhesive joints or a combination of the abovementioned connection techniques.

In order to draw the inductor loop (conductor loop) into bore holes that have previously been introduced into the ground, firstly a sufficiently high tensile strength (of a few 10 t) and secondly a certain flexibility (comparable with that of steely drill strings, bending radii greater than 100 m, for example) are required. The latter may predominantly be achieved by the line sections (line elements), while the capacitors (capacitor devices) are configured so as to be more mechanically rigid, with the result that the capacitors are subjected to virtually no bending.

Figure 8:
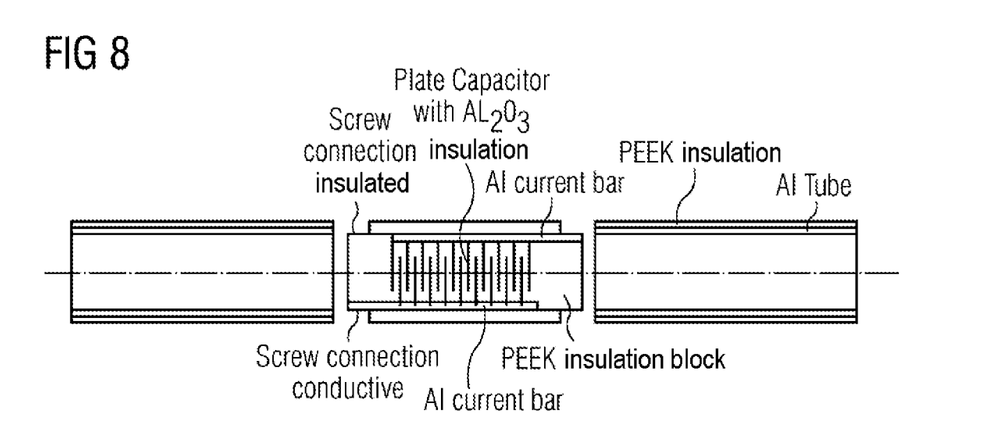
FIG. 8 depicts, schematically, an example inductor section with concentrated capacitance and pipe connection lines.

FIG. 8 depicts an inductor section including a capacitor and line sections on both sides. The specified materials ($Al_2O_3$ dielectric, Al pipes with outer polymeric insulation PEEK) are by way of example. The line sections may include a material with good electrical conductivity but which is not ferromagnetic (for example copper, aluminum). The electrical insulation of the line sections from the surrounding ground may advantageously be a ceramic coating if this ceramic coating may withstand the required bending loading. Alternatively, polymeric insulations are conceivable (fluoropolymers, PEEK, PPS, etc.). The insulations have a lower thermal loading capacity in comparison with ceramic insulations, but a temperature resistance of up to 250° C. may be achieved with the polymeric insulations since a very high dielectric strength or resistance to partial discharges in the case of the outer insulation is not required at the same time. High dielectric strengths or resistances to partial discharges at high temperatures are required in the case of the dielectric of the capacitor, however, which is characterized here as $Al_2O_3$ ceramic. However, it is also possible for glass film dielectrics or mica dielectrics to be used.

The individual plates of the capacitor stack (capacitor unit of the capacitor device) may be welded, soldered, or adhesively bonded to one another using a high-temperature adhesive, (e.g., Elecolit® available from Panacol Adhesives, Steinbach, Germany). The "current bars" illustrated in FIG. 8 may be in the form of tubular half-shells, and thus may produce the connection with a current-carrying capacity simply by screwing to the line sections. The capacitor stack may in turn be adhesively bonded, welded, or soldered to the tubular half-shells.

Advantageously, a separation of the functions corresponding to the different electrical and mechanical requirements is performed, as a result of which the materials that are best suited in each case may be used.

The following advantages may result in, inter alia, one or more of the following, (1) High dielectric strengths or resistances to partial discharges at simultaneously high temperatures of the capacitors with ceramic (or glass film, mica) dielectrics may be achieved. (2) Flexibility is predominantly achieved by the more flexible connecting lines, where the electrical requirements for the outer insulation are reduced. This largely enables a rigid design of the capacitors, which, for the first time, enables the use of ceramics. (3) Suitable dimensioning allows connecting lines with a length below 20 m, for which transport is easily possible. Thus, conductor loops with large total lengths (1-3 km) may also be realized since assembly does not need to take place until at the bore hole. (4) Acceptance tests with respect to mechanical and electrical requirements may be performed for each capacitor and each connecting line independently in suitable test chambers (e.g., furnaces with partial discharge measurement devices) prior to integration in the entire system. (5) Replacement of defective capacitors or connecting lines is possible (after drawing of the inductor). (6) Production of the components of a conductor loop may be performed simultaneously at different production sites.

Subject matter of the present embodiments includes methods for producing a conductor loop. Such methods are characterized by the fact that a plurality of capacitor devices is electrically conductively and mechanically connected to in each case two adjacent line elements via the connection interfaces of the capacitor devices. Thus, owing to the use of a plurality of capacitor devices, the same advantages are achieved as have been explained in detail with reference to a conductor loop or with reference to a capacitor device.

The methods may be developed by virtue of the fact that the conductor loop is then provided, at least sectionally, with an insulation layer. This may be performed, for example, by wrapping with a strip of insulation. In particular, in this case, insulation of the gaps between the capacitor devices and the line elements is performed. This may be sufficient in particular when both the capacitor device and the line element have already been provided in advance with a layer of insulation. Complete insulation in situ by a continuous layer of insulation is also conceivable.

It is likewise a development of a method if the distance between the capacitor devices is set by the corresponding length of the line elements located therebetween in such a way that the inductance per unit length, which is dependent on the geometry of the respective conductor loop section, is compensated for in the case of use by the capacitor device with a constant or substantially constant capacitance. Conductor elements with a constant or substantially constant, in particular, uniform length, may be used. The selection may be performed in such a way that the inductance, which is dependent on the geometry of the respective conductor loop section, is compensated for. It is also possible for both the capacitance value of the capacitor devices and the length of the line elements to be adapted for sectional compensation of the inductance of the conductor loop.

DETAILED DESCRIPTION

Elements having the same function and mode of operation have been provided in each case with the same reference symbols in FIGS. 1 to 8.

FIG. 1 depicts a first embodiment of a capacitor device 10. The capacitor device is provided with a housing 20, which may have an electrically insulating effect. A capacitor unit 30 is arranged in the interior of this housing 20. The capacitor unit has a multiplicity of opposite capacitor plates 34, where each plate may be referred to as a capacitor plate stack. The capacitor plates 34 are all carried by a plate carrier 38. The respective plate carrier 38 at the same time forms, at least partially, the connection interfaces 32*a* and 32*b*. Mechanical and electrically conductive contact is made with line elements 110 connected there later at these connection interfaces 32*a* and 32*b*.

Figure 3:
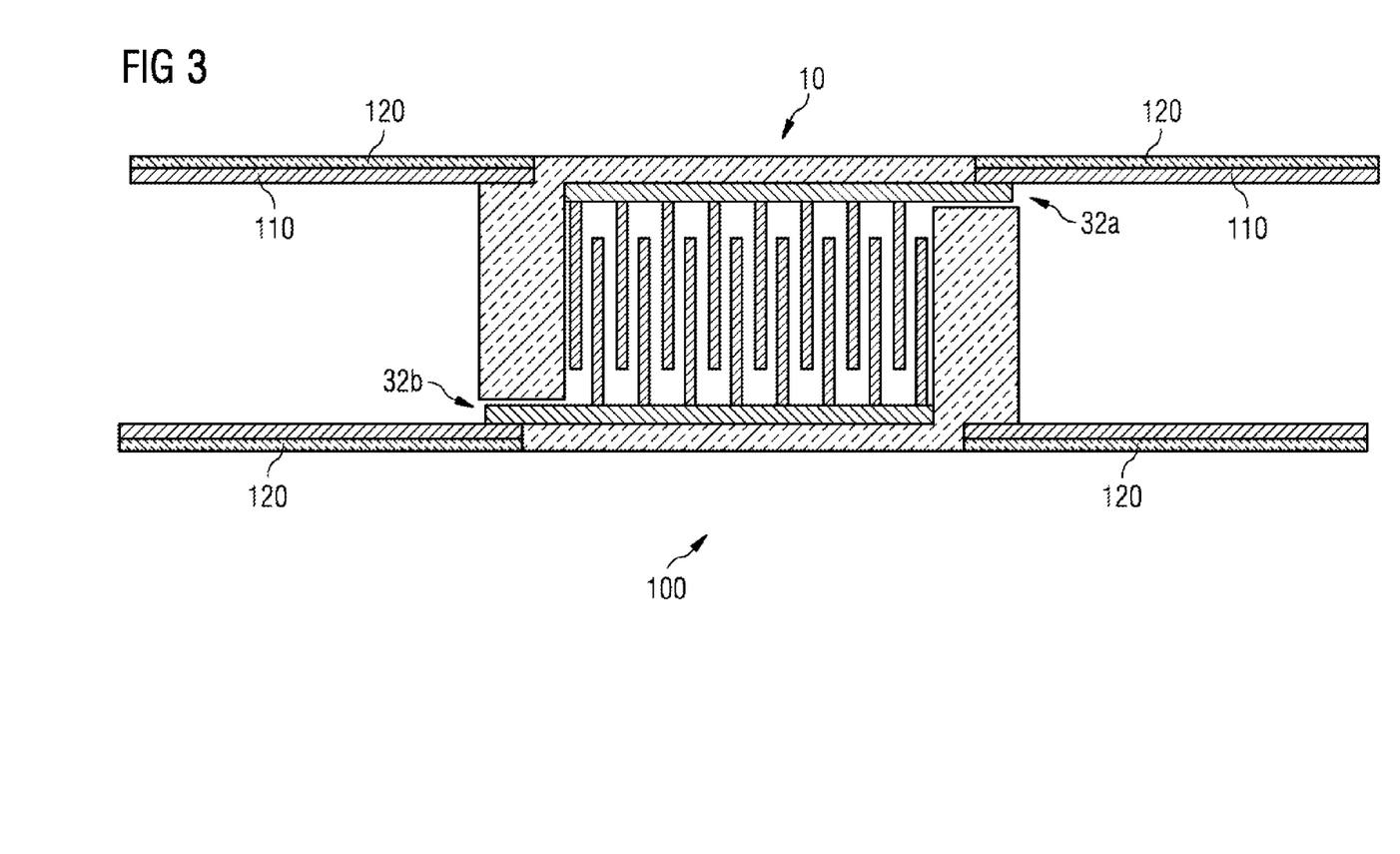
FIG. 3 depicts, schematically, an embodiment of a conductor loop.

The assembled variant is depicted, for example, in FIG. 3. In FIG. 3, a line element 110 is attached to the respective connection interface 32*a* and 32*b* in the case of a capacitor device 10 as depicted in FIG. 1 on both sides. The connection may be performed mechanically by a press fit, e.g., by a thermal shrinkfit. The line elements 110 are surrounded by a layer of insulation 120, in particular including plastic. Thus, complete electrical insulation from the outside is provided, which is then continued through the housing 20 by the capacitor unit 10. The gap between the capacitor device 10 and the line element 110 may additionally be electrically insulated with a strip of insulation, for example.

As may be seen in FIG. 3, the line elements 110 are hollow and the capacitor unit 30 is concentrated on the capacitor device 10. The line elements 110 may thus withstand bending and tensile loading without such a stress resulting in breakages or mechanical damage to the capacitor unit 30 in the capacitor device 10.

Figure 2:
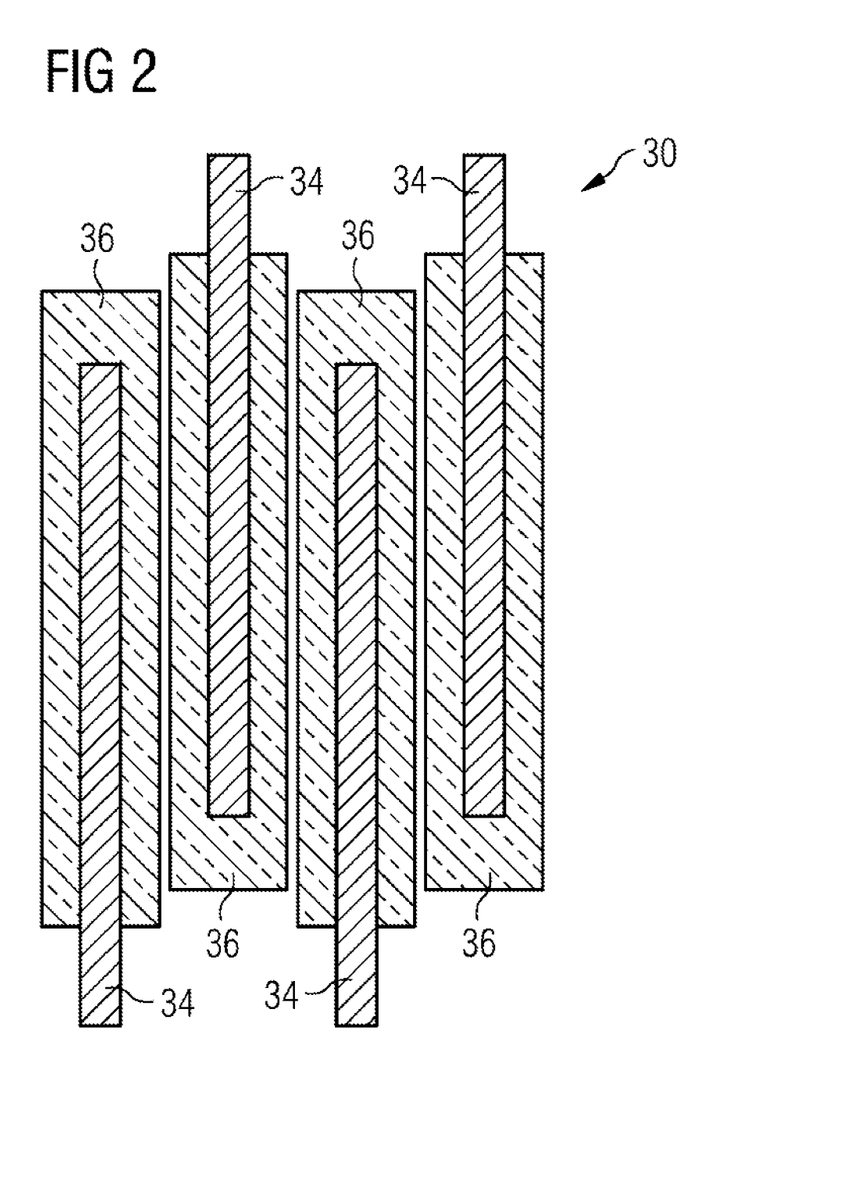
FIG. 2 depicts, schematically, a further embodiment of a capacitor unit.

FIG. 2 illustrates a further embodiment of a capacitor unit 30. In FIG. 2, the individual capacitor plates 34 are coated with a dielectric layer, with the result that, by virtue of subsequent compression, a stack may be provided for the capacitor unit 30. In the case of such an embodiment, the space requirement is firstly reduced and at the same time the required mechanical stability for the capacitor unit 30 is provided.

Figure 4:
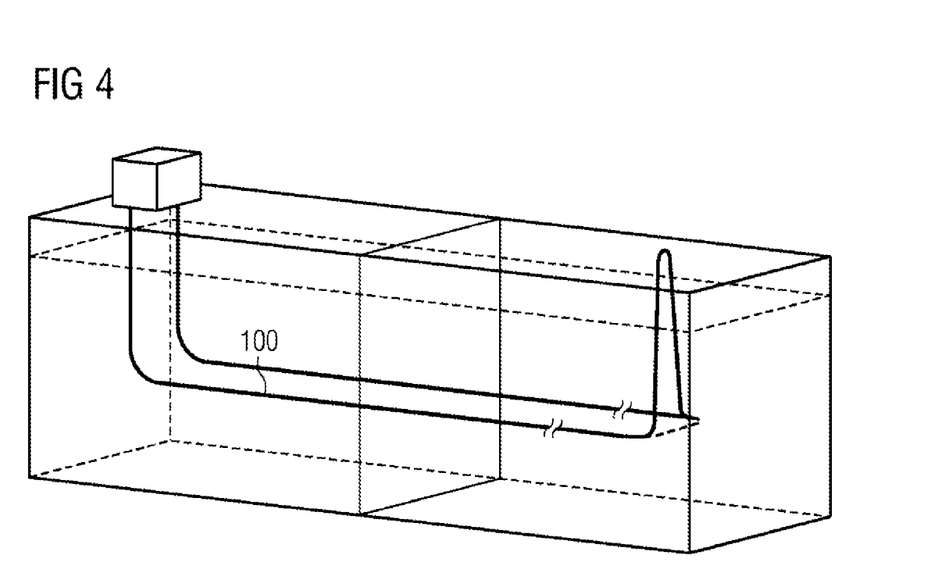
FIG. 4 depicts, schematically, a further embodiment of a conductor loop.

FIG. 4 depicts a use situation in a schematic illustration. In FIG. 4, a conductor loop 100, as may be seen from FIG. 3, for example, is laid in the ground. The box depicts an operating station via which the voltage for the induction operation of the conductor loop 100 may be set.

A conductor loop may be configured flexibly, with the result that the conductor loop may be bent and may be introduced into any desired bore hole.

As already explained, FIG. 8 depicts an inductor section includes a capacitor and line sections on both sides. The cited materials ($Al_2O_3$ dielectric, Al pipes with outer polymeric insulation PEEK) are by way of example. The line sections may include a material with good electrical conductivity but which is not ferromagnetic (for example, copper, aluminum). The electrical insulation of the line sections with respect to the surrounding ground may advantageously be a ceramic coating, if this ceramic coating may withstand the required bending loading. Alternatively, polymeric insulations are conceivable (fluoropolymers, PEEK, PPS, etc.). These polymeric insulations have a lower thermal loading capacity in comparison with ceramic insulations, but a temperature resistance of up to 250° C. may be achieved with the polymeric insulations since a very high dielectric strength or resistance to partial discharges in the case of the outer insulation is not simultaneously required. High dielectric strengths or resistances to partial discharges at high temperatures are required in the case of the dielectric of the capacitor, however, which is referred to here as $Al_2O_3$ ceramic. However, glass film or mica dielectrics may also be used.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A capacitor device comprising:
   a housing; and
   a capacitor unit arranged within the housing for compensating for an inductive voltage drop along a conductor loop of a device for in situ production of heavy oil and bitumen from oil sands deposits,
   wherein two connection interfaces are provided, wherein each connection interface of the two connection interfaces is configured for a mechanical and electrically conductive connection between the capacitor unit and a line element of the conductor loop,
   wherein the capacitor device is mechanically rigid and each line element is flexible, and
   wherein the capacitor device is connected to the line elements prior to insertion into a bore hole such that the line elements are subjected to tensile loading, while the capacitor device is not subjected to the tensile loading, during insertion into the bore hole.

2. The capacitor device as claimed in claim 1, wherein the capacitor unit comprises two capacitor plates with a dielectric layer arranged between the two capacitor plates, wherein the two capacitor plates are each in electrically conductive contact with a connection interface of the two connection interfaces.

3. The capacitor device as claimed in claim 2, wherein the capacitor unit comprises two plate carriers on which, for each plate carrier, at least one capacitor plate is arranged electrically conductively.

4. The capacitor device as claimed in claim 3, wherein at least one plate carrier comprises, at least sectionally, a half-shell formation.

5. The capacitor device as claimed in claim 4, wherein each capacitor plate of the two capacitor plates comprises, at least partially, a coating as dielectric layer.

6. The capacitor device as claimed in claim 2, wherein each capacitor plate of the two capacitor plates comprises, at least partially, a coating as dielectric layer.

7. The capacitor device as claimed in claim 6, wherein the dielectric layer is, at least partially, in fluid form.

8. The capacitor device as claimed in claim 7, wherein the capacitor unit, the housing, or the capacitor unit and the housing are filled with a free-flowing, curable material.

9. The capacitor device as claimed in claim 1, wherein the capacitor unit, the housing, or the capacitor unit and the housing are filled with a free-flowing, curable material.

10. The capacitor device as claimed in claim 1, wherein each connection interface of the two connection interfaces is configured for at least one of the following types of mechanical connection: (1) screwing, (2) welding, (3) riveting, or (4) fitting.

11. The capacitor device as claimed in claim 10, wherein the fitting is a press fitting.

12. A conductor loop comprising:
a plurality of line elements for a device for in situ production of heavy oil and bitumen from oil sands deposits, wherein each line element is, at least sectionally, flexible; and
a plurality of mechanically rigid capacitor devices, wherein each capacitor device comprises a housing and a capacitor unit arranged within the housing for compensating for an inductive voltage drop along the conductor loop,
wherein each capacitor device of the plurality of capacitor devices is electrically conductively and mechanically connected to two adjacent line elements via connection interfaces prior to insertion into a bore hole such that the plurality of line elements is subjected to tensile loading, while the plurality of capacitor devices is not subjected to the tensile loading, during insertion into the bore hole.

13. The conductor loop as claimed in claim 12, wherein a number of the plurality of line elements exceeds a number of the plurality of capacitor devices by more than 1.

14. The conductor loop as claimed in claim 12, wherein each line element of the plurality of line elements comprises, at least partially, metallic pipe.

15. The conductor loop as claimed in claim 14, wherein the metallic pipe is aluminum pipe.

16. The conductor loop as claimed in claim 12, wherein the conductor loop is in the form of an inductor cable for inductively heating a heavy oil or oil sands deposit, wherein the inductor cable comprises:
one flexible metallic conductor in each first flexible section of a plurality of first flexible sections, and
at least one capacitor in each second flexible section of a plurality of second flexible sections for forming a series resonant circuit.

17. The conductor loop as claimed in claim 16, wherein the flexible metallic conductor is in the form of a line element.

18. The conductor loop as claimed in claim 12, wherein each capacitor device is 0.5-1 meter long, and each line element is 10-20 meters long.

19. A method for producing a conductor loop, the method comprising:
electrically conductively and mechanically connecting each capacitor device of a plurality of capacitor devices to two adjacent line elements of the plurality of line elements via connection interfaces prior to insertion into a bore hole, wherein each capacitor device of the plurality of capacitor devices comprises a housing and a capacitor unit arranged within the housing for compensating for an inductive voltage drop along the conductor loop, and wherein each capacitor device is mechanically rigid; and
inserting the connected capacitor devices and line elements into the bore hole,
wherein the plurality of line elements is subjected to tensile loading, while the plurality of capacitor device is not subjected to the tensile loading, during insertion into the bore hole.

20. The method as claimed in claim 19, wherein the conductor loop is provided, at least sectionally, with an insulation layer.

* * * * *